(12) United States Patent
Yoshikawa et al.

(10) Patent No.: US 11,196,312 B2
(45) Date of Patent: Dec. 7, 2021

(54) MOTOR

(71) Applicant: Panasonic Intellectual Property Management Co., Ltd., Osaka (JP)

(72) Inventors: Yuichi Yoshikawa, Osaka (JP);
Keiichiro Nukada, Nara (JP);
Hirokazu Yamauchi, Osaka (JP);
Mitsuoki Hishida, Osaka (JP); Yasushi Kato, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 16/483,054

(22) PCT Filed: Feb. 9, 2018

(86) PCT No.: PCT/JP2018/004535
§ 371 (c)(1),
(2) Date: Aug. 2, 2019

(87) PCT Pub. No.: WO2018/155221
PCT Pub. Date: Aug. 30, 2018

(65) Prior Publication Data
US 2020/0006993 A1    Jan. 2, 2020

(30) Foreign Application Priority Data
Feb. 21, 2017  (JP) .............................. JP2017-030159

(51) Int. Cl.
*H02K 3/12* (2006.01)
*H02K 3/28* (2006.01)
*H02K 3/52* (2006.01)

(52) U.S. Cl.
CPC ................. *H02K 3/12* (2013.01); *H02K 3/28* (2013.01); *H02K 3/525* (2013.01)

(58) Field of Classification Search
CPC ............ H02K 3/12; H02K 3/525; H02K 3/48; H02K 3/14; H02K 3/18
(Continued)

(56) References Cited

U.S. PATENT DOCUMENTS 6,710,496 B2 *  3/2004  Fujita ...................... H02K 3/12
                                                      310/201
9,472,987 B1 * 10/2016  Hall ......................... H02K 3/12
(Continued)

FOREIGN PATENT DOCUMENTS

DE       102012212637          1/2014
EP          2026447 A1         2/2009
(Continued)

OTHER PUBLICATIONS

Communication pursuant to Article 94(3) EPC dated Sep. 29, 2020 for the related European Patent Application No. 18756722.7.
(Continued)

*Primary Examiner* — Tulsidas G Patel
*Assistant Examiner* — Robert E Mates
(74) *Attorney, Agent, or Firm* — McDermott Will and Emery LLP

(57) ABSTRACT

A motor includes a stator including a stator core and teeth respectively protruding from the stator core in predetermined directions of protrusion, and coils respectively wound onto the teeth n (n is an integer of 3 or greater) turns including first to n-th turns. A k-th (k is an integer, 1<k<n) turn of each of the coils lies at a center of a range wound with each of the coils onto the teeth in a corresponding one of the directions of protrusion of the teeth from the stator core. Each of the first turn and the n-th turn when each of the coils is cut in a corresponding one of the directions of protrusion of the teeth is greater in cross-sectional area than the k-th turn.

11 Claims, 8 Drawing Sheets

(58) Field of Classification Search
USPC .................................. 310/198, 201, 200, 208
See application file for complete search history.

(56) References Cited

U.S. PATENT DOCUMENTS

| | | | | |
|---|---|---|---|---|
| 2002/0121829 | A1* | 9/2002 | Konig | H02K 3/18 310/208 |
| 2004/0055139 | A1* | 3/2004 | Kuroyanagi | H02K 15/0442 29/596 |
| 2009/0102309 | A1* | 4/2009 | Kamibayashi | H02K 3/12 310/195 |
| 2013/0026875 | A1* | 1/2013 | Hao | H02K 3/12 310/198 |
| 2013/0093281 | A1* | 4/2013 | Savagian | H02K 3/12 310/208 |
| 2015/0188371 | A1* | 7/2015 | Kato | H02K 3/18 310/208 |
| 2016/0036277 | A1* | 2/2016 | Lynch | H02K 3/34 310/54 |
| 2016/0315525 | A1 | 10/2016 | Hongo | |
| 2020/0287446 | A1 | 9/2020 | Hongo | |

FOREIGN PATENT DOCUMENTS

| | | |
|---|---|---|
| JP | 2005-137174 A | 5/2005 |
| JP | 3881520 B2 | 2/2007 |
| JP | 5592554 B1 | 9/2014 |
| JP | 6092862 B2 | 3/2017 |
| JP | 6505431 B2 | 4/2019 |
| WO | 2013/187501 A1 | 12/2013 |

OTHER PUBLICATIONS

International Search Report of PCT application No. PCT/JP2018/004535 dated Apr. 3, 2018.
The Extended European Search Report dated Dec. 19, 2019 for the related European Patent Application No. 18756722.7.

* cited by examiner

MOTOR

TECHNICAL FIELD

The technique disclosed herein relates to a structure of coils in a motor.

BACKGROUND ART

Industry motors and on-vehicle motors have been highly demanded in recent years. In particular, a low cost but highly efficient motor has been demanded.

As a method for improving efficiency of a motor, increasing a space factor of coils respectively disposed within slots of a stator has been known. Increasing a space factor of coils can suppress a loss due to a current flowing into the coils when a motor is driven.

As a method for increasing a space factor of coils, such a configuration has been proposed that molded coils made of a copper material are respectively disposed within slots (e.g., see PTL 1).

When coils are produced through molding or forming, for example, the coils have been each made uniform in cross-sectional area to achieve uniform resistance. On the other hand, heat is a factor of lowering efficiency of a motor. When Joule heat is generated, heat easily accumulates in coils. A path of radiation of heat generated in each of the coils differs depending on arrangement of members respectively lying adjacent to the coils or a flow path of refrigerant, for example. Heat distribution in the coils is therefore not uniform. In particular, heat easily accumulates in a center portion of each of the coils. However, in coils each having a cross-sectional area made uniform, heat radiation effects due to the coils are concentrated within the cross-sectional areas.

CITATION LIST

Patent Literature

PTL 1: Unexamined German Patent Publication No. 102012212637

SUMMARY OF THE INVENTION

In view of the problems described above, the technique disclosed herein has an object of further increasing heat radiation effects due to coils to achieve a highly efficient motor.

To achieve the object described above, a motor according to an aspect of the technique disclosed herein includes a stator including a stator core and teeth respectively protruding from the stator core in predetermined directions of protrusion, and coils respectively wound onto the teeth n (n is an integer of 3 or greater) turns including first to n-th turns. A k-th (k is an integer, $1<k<n$) turn of each of the coils lies at a center of a range wound with each of the coils onto the teeth in a corresponding one of the predetermined directions of protrusion of the teeth from the stator core. Each of the first turn and the n-th turn when each of the coils is cut in a corresponding one of the predetermined directions of protrusion of the teeth is greater in cross-sectional area than the k-th turn.

With the configuration, each of ends of each of the coils is greater in cross-sectional area than a center portion of each of the coils. Therefore, heat can easily radiate from the center portion, at where heat easily accumulates, of each of the coils toward both of the ends of each of the coils. The coils can therefore average thermal efficiency. Heat radiation effects due to the coils can thus further be increased, achieving a highly efficient motor.

The motor may be configured such that the k-th turn of each of the coils is smallest in cross-sectional area among the first to n-th turns. Each of the coils may gradually expand in cross-sectional area from the k-th turn to the first turn, and from the k-th turn to the n-th turn.

A motor according to another aspect of the technique disclosed herein includes a stator including a stator core and teeth respectively protruding from the stator core, and coils respectively wound onto the teeth n (n is an even number of 4 or greater) turns including first to n-th turns. In each of predetermined directions of protrusion of the teeth from the stator core, j-th and (j+1)-th turns (j is an integer, $1<j<n-1$) of each of the coils are two turns both lying closest to a center of a range wound with each of the coils onto the teeth. Each of a (j−1)-th turn and a (j+2)-th turn when each of the coils is cut in a corresponding one of the predetermined directions of protrusion of the teeth from the stator core is greater in cross-sectional area than each of the j-th turn and the (j+1)-th turn.

With the configuration, heat can easily radiate from a center portion, at where heat easily accumulates, of each of the coils toward both of the ends. The coils can therefore average thermal efficiency. Heat radiation effects due to the coils can thus further be increased, achieving a highly efficient motor.

According to the present disclosure, heat radiation effects due to the coils can be further increased, achieving a highly efficient motor.

DESCRIPTION OF EMBODIMENT

An exemplary embodiment will be described herein in detail with reference to the accompanying drawings. The preferable exemplary embodiment described below is a substantially mere example, and does not intend to limit the present invention, applications, and purposes.

EXEMPLARY EMBODIMENT (Motor Structure)

Figure 1A:
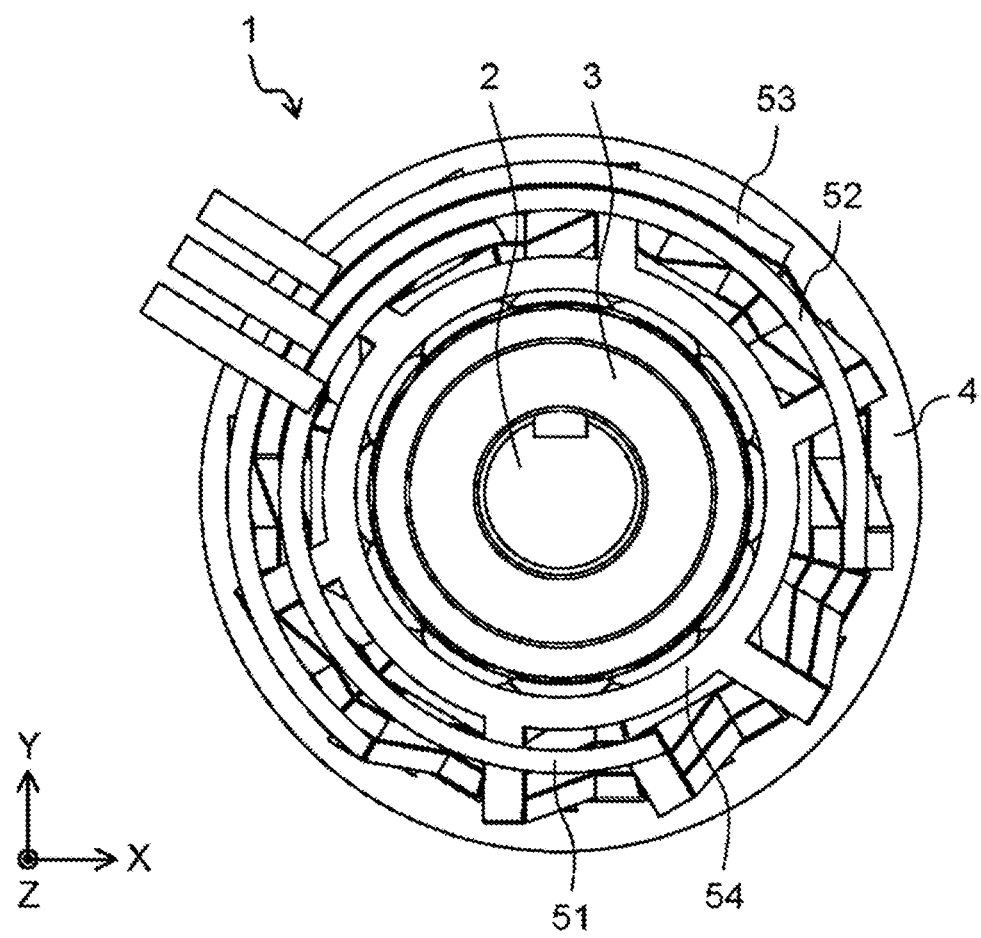
FIG. 1A is a top view illustrating a motor according to an exemplary embodiment.
Figure 1B:
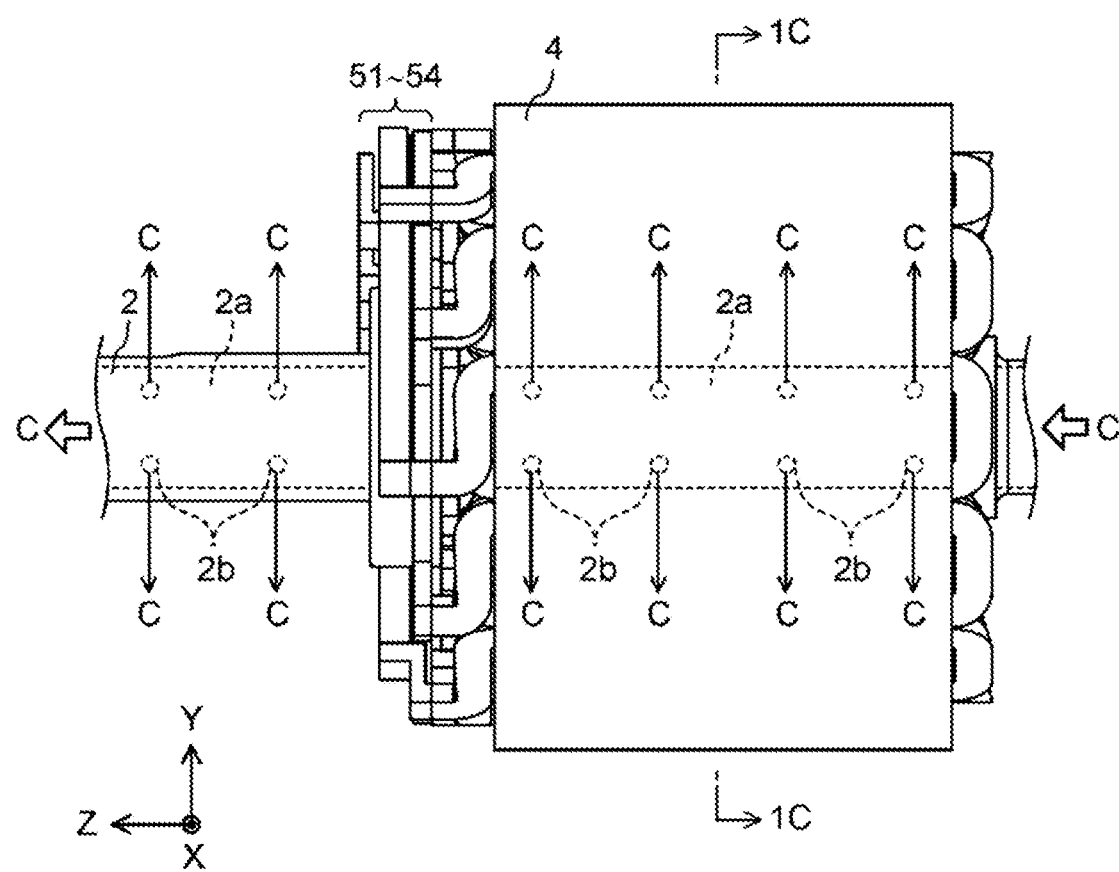
FIG. 1B is a side view illustrating the motor according to the exemplary embodiment.
Figure 1C:
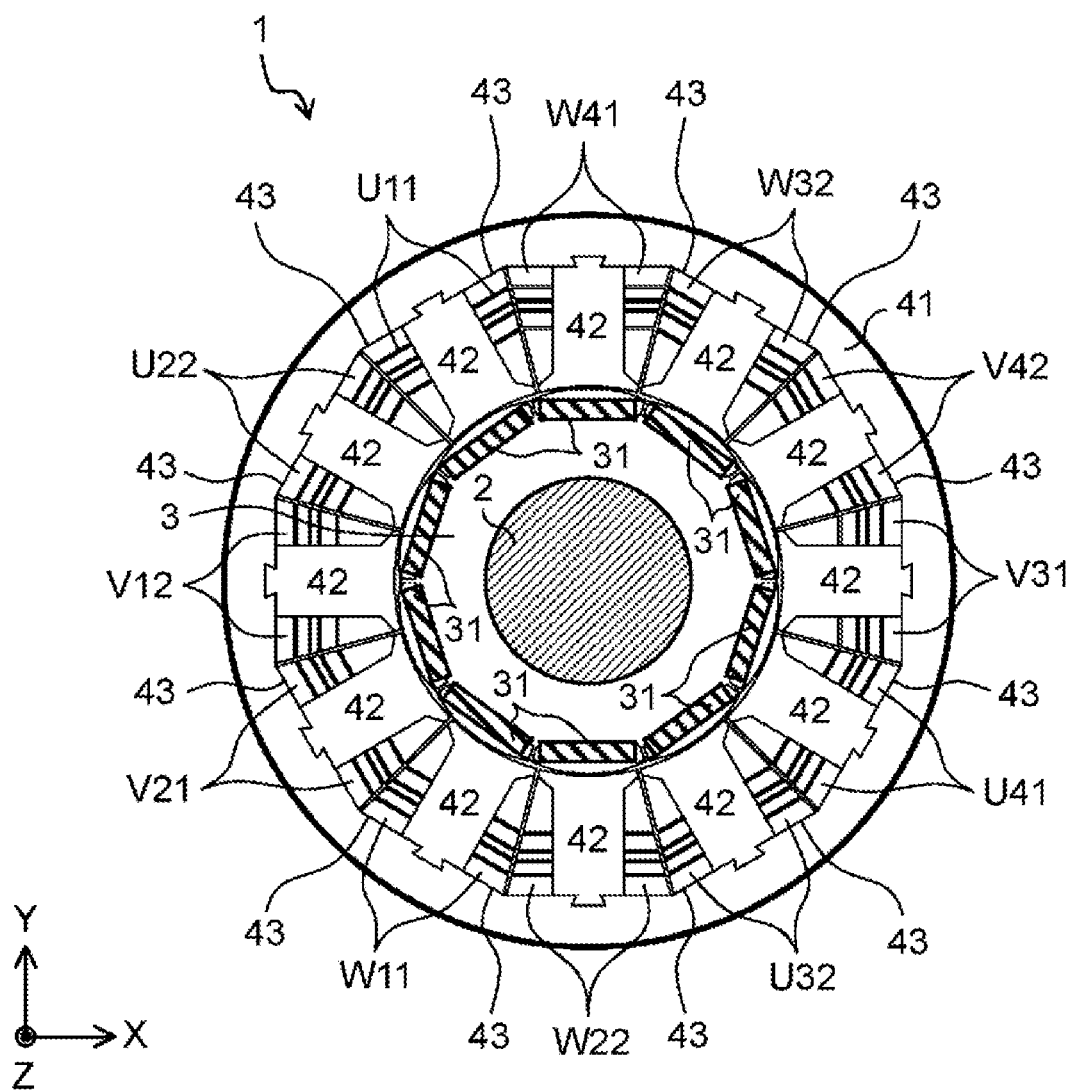
FIG. 1C is a cross-sectional view taken along line 1C-1C in FIG. 1B.

FIG. 1A is a top view illustrating motor 1 according to an exemplary embodiment. FIG. 1B is a side view illustrating motor 1 according to the exemplary embodiment. FIG. 1C is a cross-sectional view taken along line 1C-1C in FIG. 1B. However, the views do not illustrate a cover case, for example. In FIG. 1C, only a main part is illustrated as a hatched cross section. Inside of the cover case (not illustrated), motor 1 includes shaft 2, rotor 3, stator 4, coils U11 to U41, V12 to V42, and W11 to W41, and bus bars 51 to 54.

In here, a longer direction (a direction vertical to a paper plane of FIG. 1A) of shaft 2 is referred to as a Z-axis direction. Directions orthogonal to the Z-axis direction (directions parallel to the paper plane of FIG. 1A) are respectively referred to as an X-axis direction and a Y-axis direction. The X-axis direction and the Y-axis direction are orthogonal to each other.

A term "integrated" or "integrally" denotes a state of an object where not only a plurality of constituent parts are mechanically coupled with each other with bolts or through caulking, for example, but also a plurality of constituent parts are electrically coupled with each other through material coupling such as covalent coupling, ion coupling, or metal coupling, for example, or a plurality of constituent parts are electrically coupled with each other through material coupling after all of the constituent parts are melted.

Shaft 2 internally includes hollow part 2a extending in the Z-axis direction. A plurality of through holes 2b are provided on a side surface of shaft 2. Hollow part 2a serves as a passage for refrigerant C used to cool inside of motor 1. Refrigerant C flows inside of hollow part 2a in the Z-axis direction to circulate and flow inside of motor 1. Some of refrigerant C flowing inside of hollow part 2a flows from the plurality of through holes 2b outward from around a center of motor 1, i.e., flows from rotor 3 toward stator 4, to cool rotor 3 and stator 4.

Rotor 3 is provided to abut an outer circumference of shaft 2. Rotor 3 includes magnets 31 each facing stator 4. Magnets 31 respectively have N-poles and S-poles alternately disposed in an outer circumference direction of shaft 2. In the exemplary embodiment, neodymium magnets are used as magnets 31 used in rotor 3. However, a material and a shape of each of magnets 31 can be appropriately changed in accordance with an output of a motor, for example.

Stator 4 includes stator core 41 having a substantially annular shape, a plurality of teeth 42 provided on an inner circumference of stator core 41 at equal intervals, and slots 43 respectively provided between teeth 42. When viewed in the Z-axis direction, stator 4 is disposed outside of rotor 3 to be away from rotor 3 at a certain gap.

Stator core 41 is die-cut and formed from electromagnetic steel sheets containing silicon, for example, and laminated to each other, for example.

In the exemplary embodiment, rotor 3 includes a total of ten magnetic poles, including five N-poles and five S-poles facing stator 4. A number of slots 43 is 12. However, a number of magnetic poles of rotor 3 and a number of slots 43 are not limited to the numbers described above. A combination of another number of magnetic poles and another number of slots is also applicable.

Stator 4 includes 12 coils U11 to U41, V12 to V42, and W11 to W41. Each of coils U11 to U41, V12 to V42, and W11 to W41 is attached to a corresponding one of teeth 42, and disposed in a corresponding one of slots 43 when viewed in the Z-axis direction. That is, coils U11 to U41, V12 to V42, and W11 to W41 are respectively wound in a concentrated manner with respect to teeth 42. Furthermore, coils U11 to U41 are integrally disposed to bus bar 51, coils V12 to V42 are integrally disposed to bus bar 52, and coils W11 to W41 are integrally disposed to bus bar 53.

In each of symbols UPQ, VPQ, and WPQ representing the coils, a first letter represents one of phases of motor 1 (one of U-phase, V-phase, and W-phase in the exemplary embodiment). A second letter represents an order of arrangement of a corresponding one of the coils in the one of the phases. A third letter represents a direction of winding of the corresponding one of the coils. In the exemplary embodiment, 1 represents a clockwise direction, and 2 represents a counter-clockwise direction. Therefore, coil U11 represents a first coil in an order of arrangement in the U-phase, and a direction of winding is the clockwise direction. Coil V42 represents a fourth coil in an order of arrangement in the V-phase, and a direction of winding is the counter-clockwise direction. A term "clockwise" denotes right-handed rotation when viewed from the center of motor 1. A term "counter-clockwise" denotes left-handed rotation when viewed from the center of motor 1.

Specifically, coils U11, U41 are U-phase coils, whereas coils U22, U32 are U-bar-phase (a direction of a magnetic field is opposite to a direction of a magnetic field generated from a U-phase coil) coils. However, the coils will be collectively referred to as U-phase coils unless otherwise specified. Similarly, coils V12 to V42 and coils W11 to W41 will be respectively collectively referred to as V-phase coils and W-phase coils.

(Features of Coil Cross Section)

Figure 2:
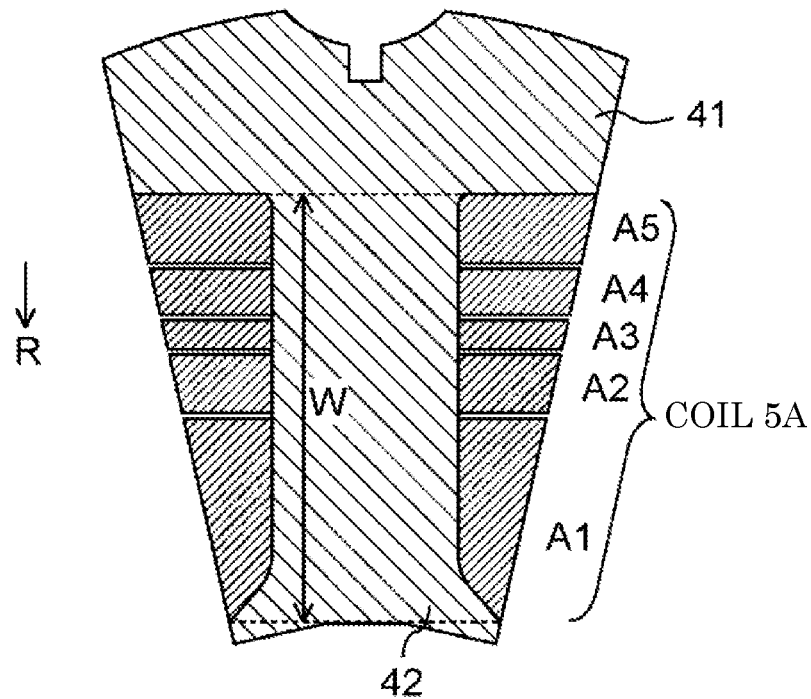
FIG. 2 is a partial enlarged view of FIG. 1C.

FIG. 2 is a partial enlarged view of the cross-sectional view of FIG. 1C. FIG. 2 illustrates one of teeth 42 respectively protruding from stator core 41, and coil 5A wound onto the one of teeth 42. Stator core 41 lies on an outer side of motor 1. Teeth 42 lie adjacent to the center of motor 1. Coil 5A corresponds to one of coils U11 to U41, V12 to V42, and W11 to W41 illustrated in FIG. 1C. Coil 5A is mainly made of one of materials including copper, aluminum, zinc, magnesium, brass, iron, and steel use stainless (SUS), for example.

Each of the directions of protrusion of teeth 42 from stator core 41 is herein referred to as an R direction. FIG. 2 illustrates a cross section in the R direction. In FIG. 2, coil 5A is wound onto the one of teeth 42 five turns. A1 to A5 respectively represent cross sections at a first turn to a fifth turn of coil 5A. Symbols A1 to A5 may respectively represent cross-sectional areas at turns A1 to A5.

In the exemplary embodiment, the turns of coil 5A are not made uniform, but vary in cross-sectional area. A range wound with coil 5A onto the one of teeth 42 in the R direction is referred to as range W. In here, third turn A3 of coil 5A lies at a center of range W. Third turn A3 of coil 5A is smaller in cross-sectional area than each of first turn A1 and fifth turn A5 respectively lying at both of ends of range W.

In the configuration in FIG. 2, third turn A3 of coil 5A is smallest in cross-sectional area among first turn A1 to fifth turn A5. Coil 5A gradually expands in cross-sectional area from the third turn to the first turn (A3<A2<A1). Coil 5A gradually expands in cross-sectional area from the third turn to the fifth turn (A3<A4<A5). In other words, coil 5A gradually expands in cross-sectional area from the center toward both of the ends of range W.

With the configuration described above, heat easily radiates from an outside turn of coil 5A, i.e., from the fifth turn, to stator core 41. Heat also easily radiates from an inside turn of coil 5A, i.e., from the first turn, via refrigerant C flowing inside of shaft 2 lying adjacent to the center of motor 1. Heat in a center portion of coil 5A, where heat of each of teeth 42 easily accumulates, i.e., in this case, heat in the third turn, radiates via the turns lying at both sides of the center portion, i.e., via the first and second turns, toward the center of motor 1, as well as radiates, via the fourth and fifth turns, to stator core 41. As described above, parts lying at both of the ends in coil 5A are made greater in cross-sectional area than the center portion, at where heat easily accumulates. Coil 5A can thus average thermal efficiency.

Even when a number of turns of a coil is an odd number other than five, the configuration described herein may be similarly applied. In other words, a k-th (k is an integer, $1<k<n$) turn of coil 5A lies at a center of a range wound with coil 5A onto each of teeth 42 $n$ (n is an integer of 3 or greater) turns. Each of the first turn and the n-th turn when coil 5A is cut in a corresponding one of the directions of protrusion of teeth 42 from stator core 41 may be greater in cross-sectional area than the k-th turn.

Turn A1 has a quadrangular cross section having opposite sides that are not parallel to each other. This can increase a space factor of coil 5A.

Figure 3:
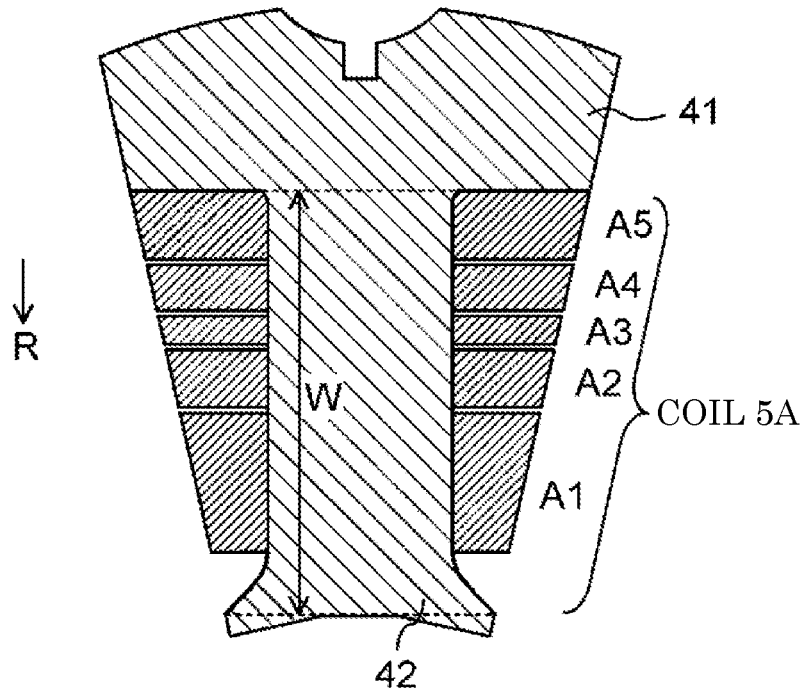
FIG. 3 is another partial enlarged view of FIG. 1C.
Figure 4:
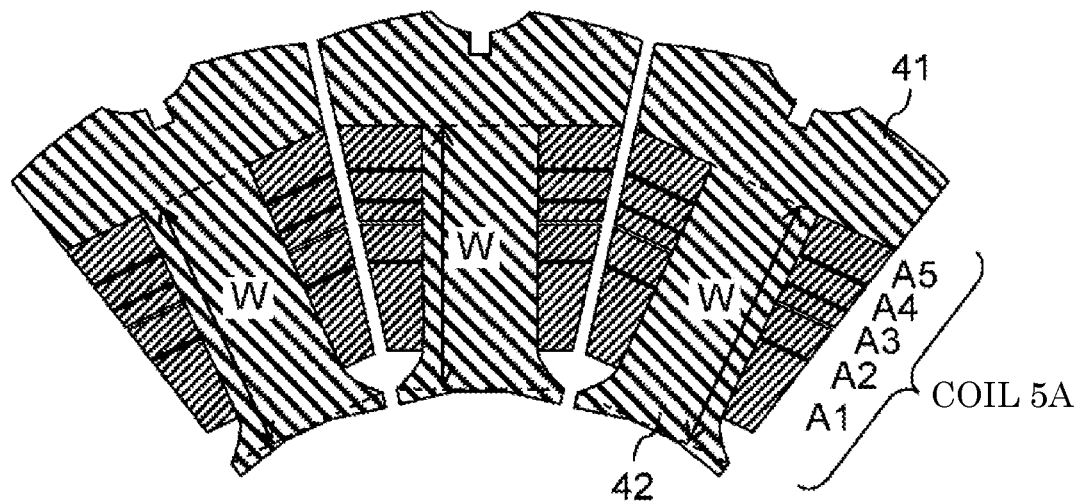
FIG. 4 is still another partial enlarged view of FIG. 1C.

FIG. 3 is another partial enlarged view of FIG. 1C. FIG. 4 is still another partial enlarged view of FIG. 1C. In FIG. 3, coil 5A has a trapezoidal cross section. With coil 5A having a trapezoidal cross section, a space factor of coil 5A can be increased. A side surface of coil 5A lies opposite to each of teeth 42, and extends straight. As illustrated in FIG. 4, with coil 5A having the side surface that lies opposite to a corresponding one of teeth 42 and that extends and aligns straight, a gap between coils 5A wound onto two adjacent ones of teeth 42 can be kept uniform, suppressing coating from being damaged due to contact.

Figure 5:
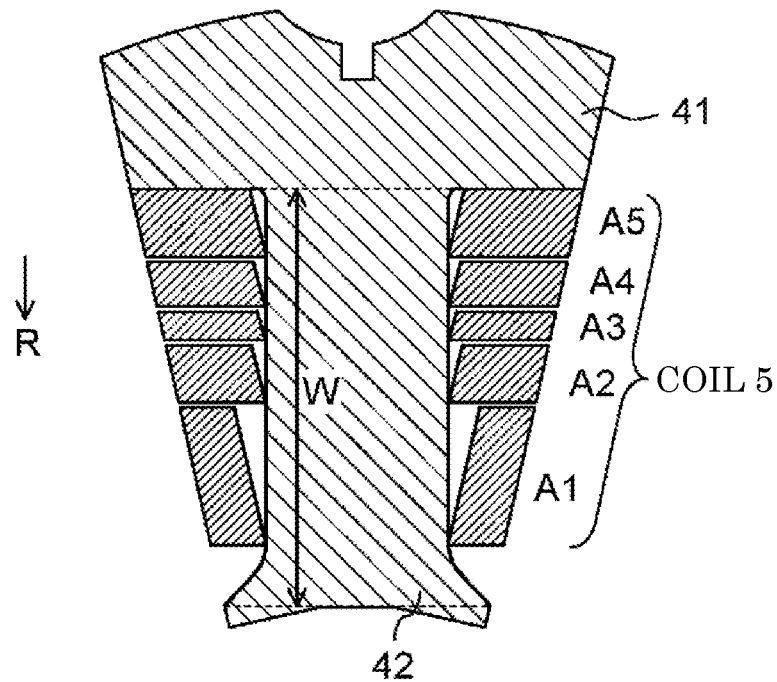
FIG. 5 is a different partial enlarged view of FIG. 1C.

FIG. 5 is a different partial enlarged view of FIG. 1C. In FIG. 5, coil 5A has a parallelogram cross section. With the parallelogram coil cross section, which is a shape, a space factor of coil 5A can be increased. As well as, as illustrated in FIG. 4, a gap between coils 5A wound onto adjacent ones of teeth 42 can be kept uniform, suppressing coating from being damaged due to contact. As a result, refrigerant C can easily flow into the gap formed between each of teeth 42 and each of coils 5.

Figure 6:
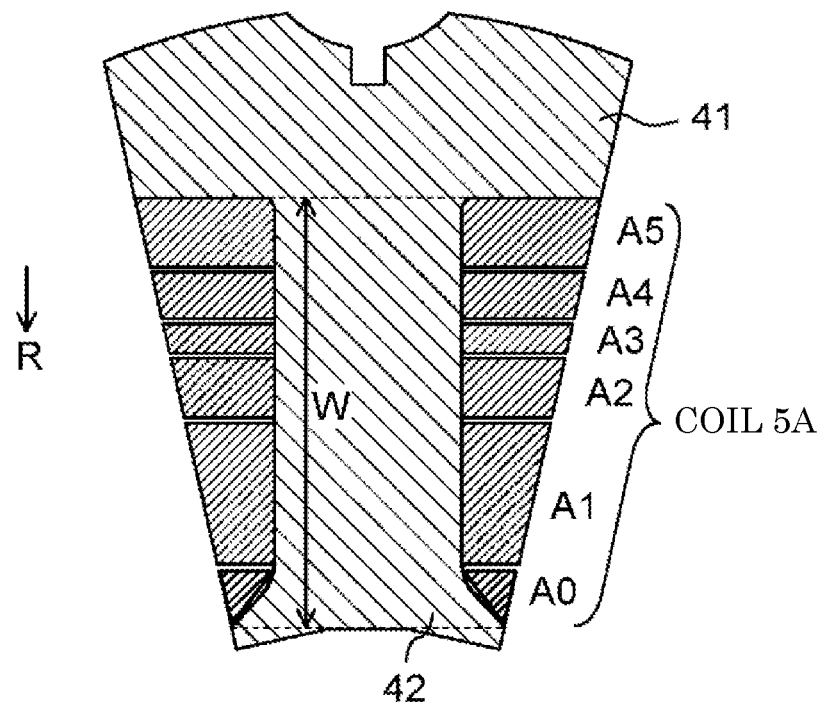
FIG. 6 is another different partial enlarged view of FIG. 1C.

FIG. 6 is another different partial enlarged view of FIG. 1C. In FIG. 6, turn A0 of coil 5A lies at a most distant position from stator core 41 in a corresponding one of the directions of protrusion of teeth 42 and has a triangular cross section. Therefore, a part having a slanted cross section of each of teeth 42 can be embedded in coil 5A, increasing a space factor of coil 5A.

Figure 7:
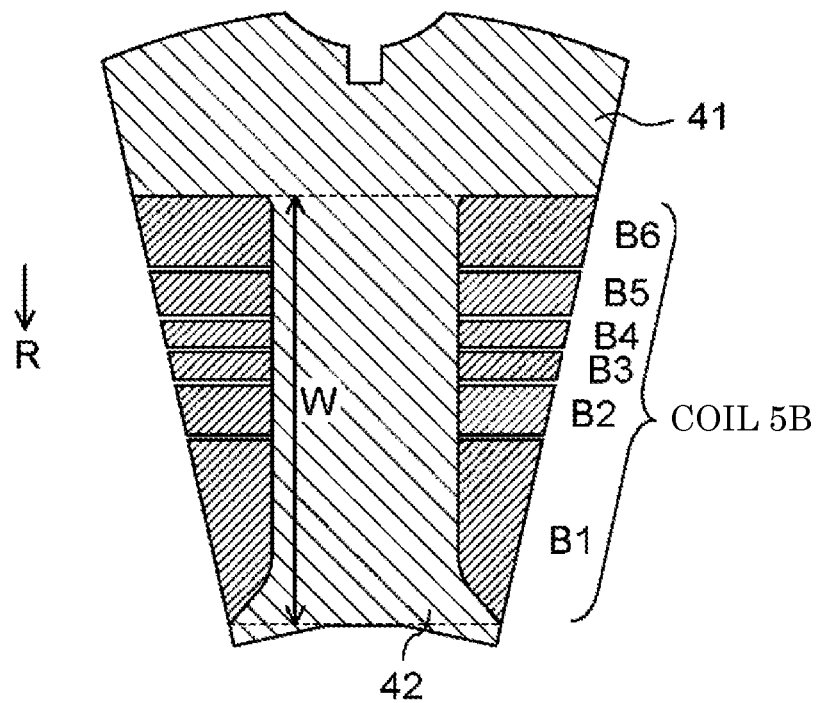
FIG. 7 is a cross-sectional view illustrating a configuration where a number of turns of each of coils of the motor according to the exemplary embodiment is six.

A number of turns may be an even number. FIG. 7 is a cross-sectional view illustrating a configuration where a number of turns of each of coils of the motor according to the exemplary embodiment is six. Similar to FIG. 2, FIG. 7 illustrates one of teeth 42 respectively protruding from stator core 41, and coil 5B wound onto the one of teeth 42. Similar to coil 5A, coil 5B corresponds to one of coils U11 to U41, V12 to V42, and W11 to W41 illustrated in FIG. 1C. Coil 5B is mainly made of one of materials including copper, aluminum, zinc, magnesium, brass, iron, and SUS, for example.

In here, coil 5B is wound onto the one of teeth 42 six turns. B1 to B6 respectively represent cross sections at a first turn to a sixth turn of coil 5B. Symbols B1 to B6 may respectively represent cross-sectional areas at B1 to B6.

In the configuration in FIG. 7, two turns of coil 5B lie closest to a center of range W, and are the third and fourth turns. Third and fourth turns B3, B4 lie adjacent to the center of range W. Each of third and fourth turns B3, B4 is smaller in cross-sectional area than each of second turn B2 and fifth turn B5 both lying outsides of third and fourth turns B3, B4. In this case, the cross-sectional areas at B3, B4 may be identical to each other. Otherwise, one of the cross-sectional areas at B3, B4 may be greater than another one of the cross-sectional areas at B3, B4.

As described above, with parts that lie on both sides of a center portion of coil 5B and that are each greater in cross-sectional area than the center portion of coil 5B, heat can securely radiate outward of coil 5B from the center portion, at where heat of teeth 42 easily accumulates, of coil 5B.

Even when a number of turns of a coil is an even number other than six, the configuration described herein may be similarly applied. In other words, in each of the directions of protrusion of teeth 42 from stator core 41, j-th and (j+1)-th turns (j is an integer, $1<j<n-1$) of coil 5B are two turns both lying closest to the center of the range wound with coil 5B onto each of teeth 42. Each of a (j−1)-th turn and a (j+2)-th turn when coil 5B is cut in a corresponding one of the directions of protrusion of teeth 42 from stator core 41 may be greater in cross-sectional area than each of the j-th turn and the (j+1)-th turn.

Turn B1 has a quadrangular cross section having opposite sides that are not parallel to each other. This can increase a space factor of coil 5B.

Figure 8:
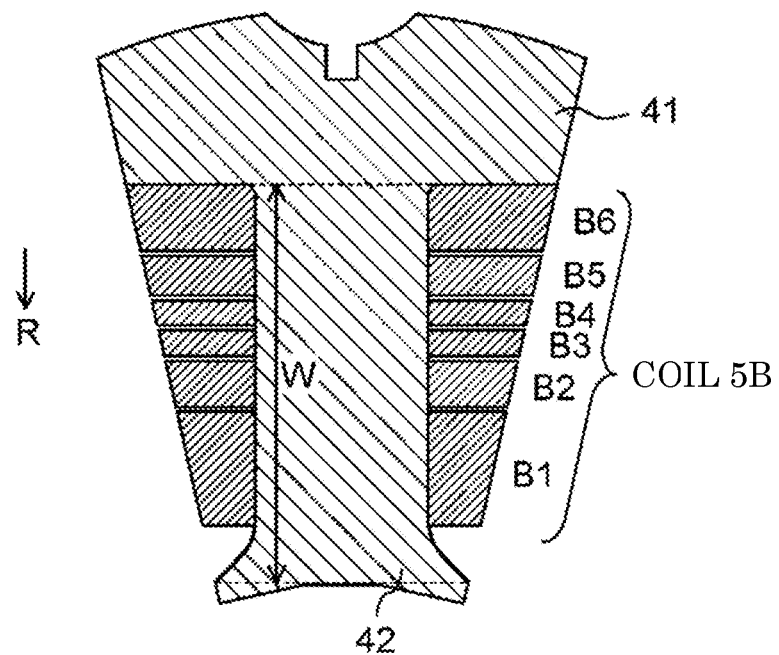
FIG. 8 is another cross-sectional view of FIG. 7.
Figure 9:
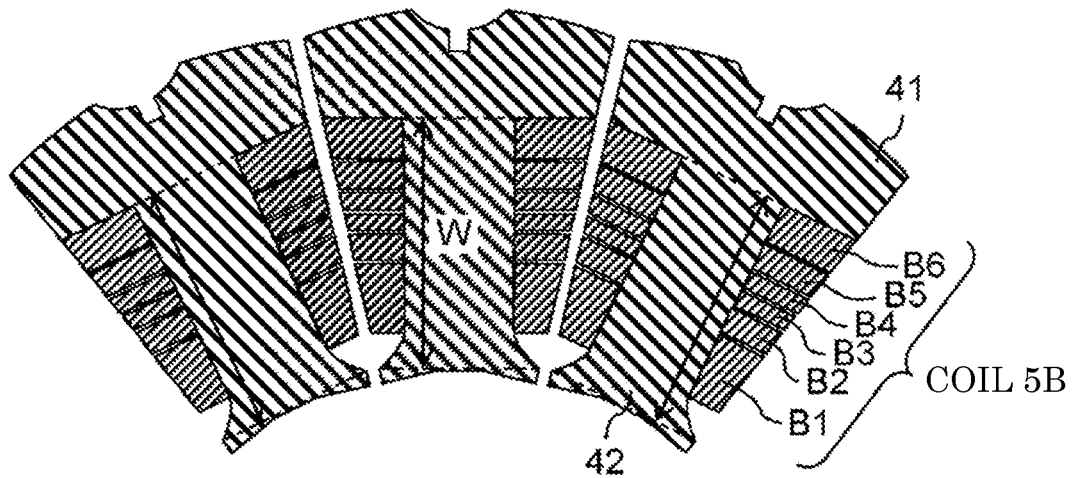
FIG. 9 is still another cross-sectional view of FIG. 7.

FIG. 8 is another partial enlarged view of FIG. 7. FIG. 9 is still another partial enlarged view of FIG. 7. In FIG. 8, coil 5B has a trapezoidal cross section. With coil 5B having a trapezoidal cross section, a space factor of coil 5B can be increased. A side surface of coil 5B lies opposite to each of teeth 42, and extends straight. As illustrated in FIG. 9, with coil 5B having the side surface that lies opposite to a corresponding one of teeth 42 and that extends straight, a gap between coils 5B wound onto two adjacent ones of teeth 42 can be kept uniform, suppressing coating from being damaged due to contact.

Figure 10:
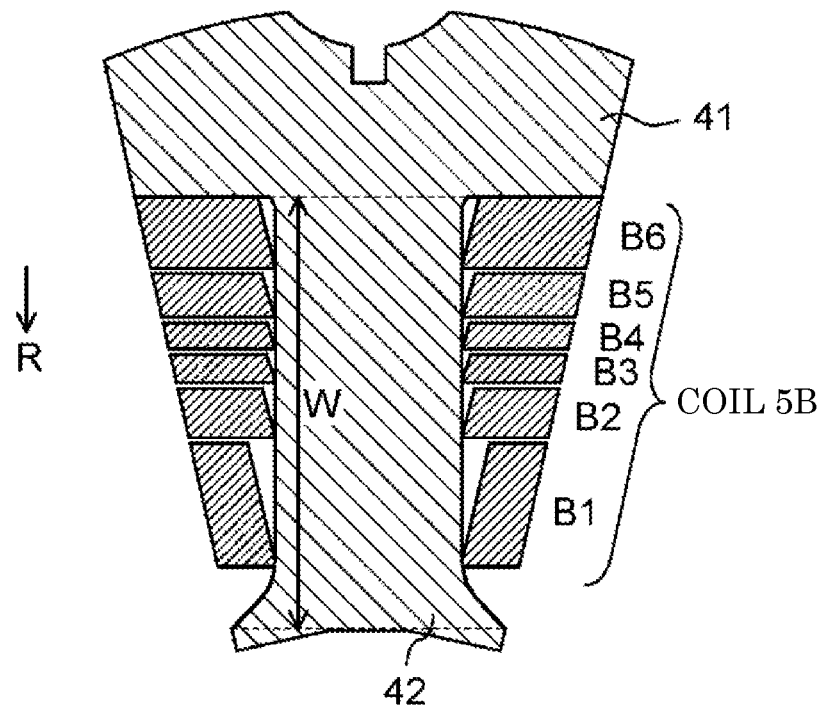
FIG. 10 is a different cross-sectional view of FIG. 7.

FIG. 10 is a different cross-sectional view of FIG. 7. In FIG. 10, coil 5B has a parallelogram cross section. With the parallelogram coil cross section, which is a shape, a space factor of coil 5B can be increased. As well as, as illustrated in FIG. 9, a gap between coils 5B wound onto adjacent ones of teeth 42 can be kept uniform, suppressing coating from being damaged due to contact. As a result, refrigerant C can easily flow into the gap formed between each of teeth 42 and each of coils 5B.

Figure 11:
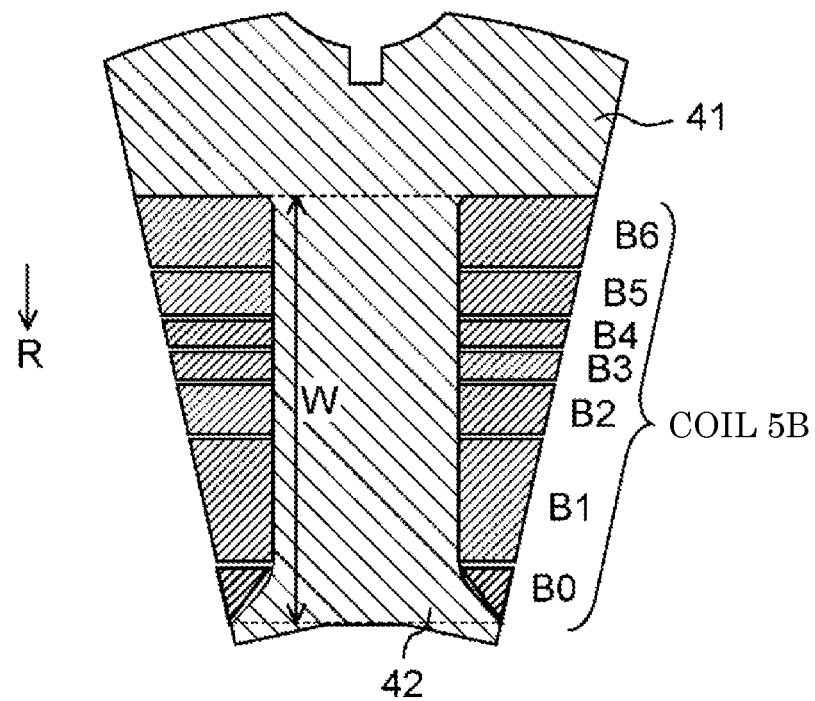
FIG. 11 is another different cross-sectional view of FIG. 7.

FIG. 11 is another different cross-sectional view of FIG. 7. In FIG. 11, turn B0 of coil 5B lies at a most distant position from stator core 41 in a corresponding one of the directions of protrusion of teeth 42 and has a triangular cross section. Therefore, a part having a slanted cross section of each of teeth 42 can be embedded in coil 5B, increasing a space factor of coil 5B.

The exemplary embodiment has illustrated the example where coils U11 to U41 are integrated with bus bar 51, coils V12 to V42 are integrated with bus bar 52, and coils W11 to W41 are integrated with bus bar 53. However, the coils may be respectively attached to the bus bars through fusing or welding, for example, to correspond to coil shapes.

In the configuration of the exemplary embodiment, refrigerant C flows in hollow part 2a of shaft 2. However, refrigerant C may circulate and flow in a gap between rotor 3 and stator 4, for example. Refrigerant C to be used can be liquid, such as oil, or gas, such as air, for example. Depending on specifications of motor 1, for example, motor 1 may be configured to be internally naturally air-cooled. Even in this case, heat radiates from the first turn of coil 5A, 5B toward a space between rotor 3 and stator 4. Coil 5A, 5B can thus average thermal efficiency.

As described above, an example of motor 1 according to the exemplary embodiment includes stator 4 including stator core 41 and teeth 42 respectively protruding from stator core 41 in the predetermined directions of protrusion, and coils 5A respectively wound onto teeth 42 $n$ (n is an integer of 3 or greater) turns including first to n-th turns. The k-th (k is an integer, 1<k<n) turn of coil 5A lies at the center of the range wound with coil 5A onto each of teeth 42 in a corresponding one of the directions of protrusion of teeth 42 from stator core 41. Each of the first turn and the n-th turn when coil 5A is cut in the corresponding one of the directions of protrusion of teeth 42 is greater in cross-sectional area than the k-th turn.

With the configuration, each of the ends of coil 5A is greater in cross-sectional area than the center portion of coil 5A. Therefore, heat can easily radiate from the center portion, at where heat easily accumulates, of coil 5A toward both of the ends of coil 5A. Coil 5A can therefore average thermal efficiency. Heat radiation effects due to coil 5A can thus further be increased, achieving a highly efficient motor 1.

Motor 1 may be configured such that the k-th turn of coil 5A is smallest in cross-sectional area among the first to n-th turns. Coil 5A may gradually expand in cross-sectional area from the k-th turn to the first turn, and from the k-th turn to the n-th turn.

Another example of motor 1 according to the exemplary embodiment includes stator 4 including stator core 41 and teeth 42 respectively protruding from stator core 41 in the predetermined directions of protrusion, and coils 5B respectively wound onto teeth 42 $n$ (n is an even number of 4 or greater) turns including first to n-th turns. In each of the directions of protrusion of teeth 42 from stator core 41, the j-th and (j+1)-th turns (j is an integer, 1≤j≤n−1) of coil 5B are two turns both lying closest to the center of the range wound with coil 5B onto each of teeth 42. Each of the (j−1)-th turn and the (j+2)-th turn when coil 5B is cut in a corresponding one of the directions of protrusion of teeth 42 is greater in cross-sectional area than each of the j-th turn and the (j+1)-th turn.

With the configuration, heat can easily radiate from the center portion, at where heat easily accumulates, of coil 5B toward both of the ends. Coil 5B can therefore average thermal efficiency. Heat radiation effects due to coil 5B can thus further be increased, achieving a highly efficient motor.

INDUSTRIAL APPLICABILITY

The present disclosure effectively further increases heat radiation effects due to the coils in the motor, achieving a low cost but highly efficient motor.

REFERENCE MARKS IN THE DRAWINGS

1: motor
2: shaft
2a: hollow part
2b: through hole
3: rotor
4: stator
5A, 5B: coil
31: magnet
41: stator core
42: teeth
43: slot
51 to 54: bus bar
A1 to A5: cross section at turn of coil 5A
B1 to B6: cross section at turn of coil 5B
C: refrigerant
U11, U22, U32, U41, V12, V21, V31, V42, W11, W22, W32, W41: coil

The invention claimed is:

1. A motor comprising:
a stator including a stator core and teeth respectively protruding from the stator core in predetermined directions of protrusion; and
coils respectively wound onto the teeth n (n is an odd integer of 3 or greater) turns including first to n-th turns, wherein:
the first to n-th turns are all turns of each of the coils provided to each of the teeth,
the first turn is farthest from the stator core and the n-th turn is closest to the stator core,
a k-th (k is (n+1)/2) turn of each of the coils lies at a center of a range wound with each of the coils onto the teeth in the predetermined directions of protrusion of the teeth, and
in a cross section cutting the stator core and the teeth, the k-th turn of each of the coils is smallest in cross-sectional area among the first to n-th turns in each of the coils.

2. The motor according to claim 1, wherein
each of the coils gradually expands in cross-sectional area from the k-th turn to the first turn, and from the k-th turn to the n-th turn.

3. The motor according to claim 1, wherein at least one of the first to n-th turns has a quadrangular cross section having opposite sides, the opposite sides being not parallel to each other.

4. The motor according to claim 1, wherein the first to n-th turns each have a trapezoidal cross section.

5. The motor according to claim 1, wherein the first to n-th turns each have a parallelogram cross section.

6. A motor comprising:
a stator including a stator core and teeth respectively protruding from the stator core in predetermined directions of protrusion; and
coils respectively wound onto the teeth n (n is an even number of 4 or greater) turns including first to n-th turns, wherein:
the first to n-th turns are all turns of each of the coils provided to each of the teeth,
j-th and (j+1)-th turns (j is n/2) of each of the coils are two turns both lying closest to a center of a range wound with each of the coils onto the teeth in the predetermined directions of protrusion of the teeth, and
in a cross section cutting the stator core and the teeth, an cross-sectional area of the j-th turn and an cross-sectional area of the (j+1)-th turn are smaller than remaining turns of the first to n-th turns other than the j-th and the (j+1)-th turn.

7. The motor according to claim 6, wherein at least one of the first to n-th turns has a quadrangular cross section having opposite sides, the opposite sides being not parallel to each other.

8. The motor according to claim 6, wherein the first to n-th turns each have a trapezoidal cross section.

9. The motor according to claim 6, wherein the first to n-th turns has each have a parallelogram cross section.

10. A motor comprising:
a stator including a stator core and teeth respectively protruding from the stator core in predetermined directions of protrusion; and
coils respectively wound onto the teeth n (n is an odd number of 5 or greater) turns including first to n-th turns, wherein:
the first to n-th turns are all turns of each of the coils provided to each of the teeth,
the first turn is farthest from the stator core and the n-th turn is closest to the stator core,
in a cross section cutting the stator core and the teeth, the first turn has a triangular cross section, and
an cross-sectional area of the j-th turn and an cross-sectional area of the (j+1)-th turn are smaller than remaining turns of the second to n-th turns other than the j-th and the (j+1)-th turn, where j=(n+1)/2.

11. A motor comprising:
a stator including a stator core and teeth respectively protruding from the stator core in predetermined directions of protrusion; and
coils respectively wound onto the teeth n (n is an even number of 4 or greater) turns including first to n-th turns, wherein:
the first to n-th turns are all turns of each of the coils provided to each of the teeth,
the first turn is farthest from the stator core and the n-th turn is closest to the stator core,
in a cross section cutting the stator core and the teeth, the first turn has a triangular cross section, and
the k-th turn of each of the coils is smallest in cross-sectional area among the second to n-th turns in each of the coils, where k is (n+2)/2.

* * * * *